(12) United States Patent
Udd (10) Patent No.: US 12,439,865 B2
(45) Date of Patent: Oct. 14, 2025

(54) METHOD AND SYSTEM FOR FELLING SAWING USING A FOREST MACHINE

(71) Applicant: PONSSE OYJ, Vieremä (FI)

(72) Inventor: Jarmo Udd, Vieremä (FI)

(73) Assignee: PONSSE OYJ, Vieremä (FI)

( * ) Notice: Subject to any disclaimer, the term of this patent is extended or adjusted under 35 U.S.C. 154(b) by 407 days.

(21) Appl. No.: 18/042,820

(22) PCT Filed: Aug. 26, 2021

(86) PCT No.: PCT/FI2021/050575
§ 371 (c)(1),
(2) Date: Feb. 24, 2023

(87) PCT Pub. No.: WO2022/043613
PCT Pub. Date: Mar. 3, 2022

(65) Prior Publication Data
US 2023/0337602 A1 Oct. 26, 2023

(30) Foreign Application Priority Data
Aug. 27, 2020 (FI) .................................... 20205836

(51) Int. Cl.
*A01G 23/091* (2006.01)
*A01G 23/081* (2006.01)
*A01G 23/099* (2006.01)

(52) U.S. Cl.
CPC ......... *A01G 23/091* (2013.01); *A01G 23/081* (2013.01); *A01G 23/099* (2013.01)

(58) Field of Classification Search
CPC .... A01G 23/08; A01G 23/083; A01G 23/091; A01G 23/095
See application file for complete search history.

(56) References Cited

U.S. PATENT DOCUMENTS

| 6,945,292 | B1 | 9/2005 | Giles et al. |
| 7,086,435 | B1 * | 8/2006 | Coulbourn, Jr. ........ A01G 23/08 144/34.1 |
| 10,136,591 | B2 * | 11/2018 | Linder .................. A01G 23/091 |
| 10,798,887 | B2 * | 10/2020 | Meyer .................... A01G 25/02 |
| 2004/0250908 | A1 | 12/2004 | Hicks |

(Continued)

FOREIGN PATENT DOCUMENTS

| EP | 2 254 402 B1 | 8/2012 |
| EP | 2 987 399 A1 | 2/2016 |
| WO | 02/35916 A1 | 5/2002 |

OTHER PUBLICATIONS

EP Application No. Communication dated Jan. 21, 2025, 6 pages.
(Continued)

*Primary Examiner* — Matthew Katcoff
(74) *Attorney, Agent, or Firm* — Lathrop GPM LLP; Alex Shtraym (57) ABSTRACT

The invention relates to a method for felling sawing using a forest machine. In the method, a felling head is used, which set near to the tree to be felled. In addition, sawing is performed on the tree using a saw device fitted to the felling head. Before sawing, the saw device is set to a selected level relative to the ground surface, which is recorded in the data system belonging to the forest machine. The invention also relates to a system for felling sawing using a forest machine.

20 Claims, 8 Drawing Sheets

(56) References Cited

U.S. PATENT DOCUMENTS

2014/0178166 A1* 6/2014 Andruch, III .......... E02F 3/436
                                                                414/815
2017/0079220 A1    3/2017 Hunt
2020/0361011 A1* 11/2020 Alfthan .................. A01G 23/08

OTHER PUBLICATIONS

EP Application No. 21786250.7, Communication dated Mar. 22, 2024, 4 pages.
International Search Report and Written Opinion of the International Searching Authority for International Patent Application No. PCT/FI2021/050575 dated Nov. 30, 2021, 9 pages.
Finnish Search Report for Finnish Patent Application No. 20205836 dated Feb. 1, 2021, 1 page.

* cited by examiner

METHOD AND SYSTEM FOR FELLING SAWING USING A FOREST MACHINE

CROSS-REFERENCE TO RELATED APPLICATIONS

This application is a National Stage Application of PCT/FI2021/050575, filed 26 Aug. 2021, which claims benefit of Ser. No. 20/205,836, filed 27 Aug. 2020 in Finland, and which applications are incorporated herein by reference. To the extent appropriate, a claim of priority is made to each of the above-disclosed applications.

FIELD OF THE INVENTION

The invention relates to a method for felling sawing using a forest machine, in which method a felling head is used, which is placed near the tree to be felled, and sawing is performed on the tree using a sawing device fitted to the felling head. The invention also relates to a system for felling sawing using a forest machine.

BACKGROUND OF THE INVENTION

Nowadays, a forest machine, such as a harvester, is equipped with a felling head, by which trees are felled and cut into various timber grades. Using the felling-head application, the tree is also limbed using the harvester head. For cutting, the felling head includes a sawing device, which is usually a chain saw.

SUMMARY OF THE INVENTION

There are several problems relating particularly to felling sawing. The principle is to fell the tree with the lowest stump possible, which can be difficult due to poor visibility. Visibility is reduced, for example, by insufficient light, undergrowth, or excessive snow. Even in favourable conditions, the sawing device can remain hidden behind the felling head or the tree being felled. The stump must then be left high for safety's sake, to avoid, for example, the sawing device striking the ground, or a stone in the vicinity of the tree. At the least, sawing into the ground will blunt the sawing device's chain. In the worst case, the saw chain will break, causing excess costs and a break in working, as well as also a hazardous situation. The high chain speed can throw pieces of a broken saw chain for a long distance.

Sawing into the ground is a risk even in normal felling sawing. The risk increases in so-called counter-sawing, in which one or more partial saw cuts are made on different sides of the tree trunk before the actual felling sawing. The sawing device then often remains invisible behind the tree trunk, causing the danger of the sawing device striking the ground or some other obstacle. Counter-sawing is needed for example due to butt swellings or when cutting particularly large trees. To avoid strikes, the stump must be left high, which reduces the yield and later hinders moving about the forest. Secondly, professional skill is needed to direct counter-sawing. In addition, after felling the butt end must often be smoothed by further sawing after several saw cuts, which wears the sawing device, takes time, and reduces yield.

The invention is intended to create a new type of method for felling sawing using a forest machine. The characteristic features of the method according to the invention are stated in the accompanying claim 1. The use of the method according to the invention ensures, for example, safe sawing, so that excessive wear and accidents can be avoided. As can excessively high stumps. In addition, different saw cuts on the same tree can be aligned more easily and precisely than before. Tree felling is then accelerated and the quality of commercial timber improved. The invention is also intended to create a new type of system for felling sawing using a forest machine. The characteristic features of the system according to the invention are stated in the accompanying claim 13. The system is easily started and its actual operation is simple. The arrangement aids the driver, and even performs some of the operations automatically. Thus the forest machine's productivity improves and the driver can concentrate on core operations. Sawing, however, is safe and correctly oriented.

BRIEF DESCRIPTION OF THE DRAWINGS

In the following, the invention is shown in detail with reference to the accompanying drawings showing some embodiments of the invention.

DETAILED DESCRIPTION OF THE DRAWINGS

Figure 1:
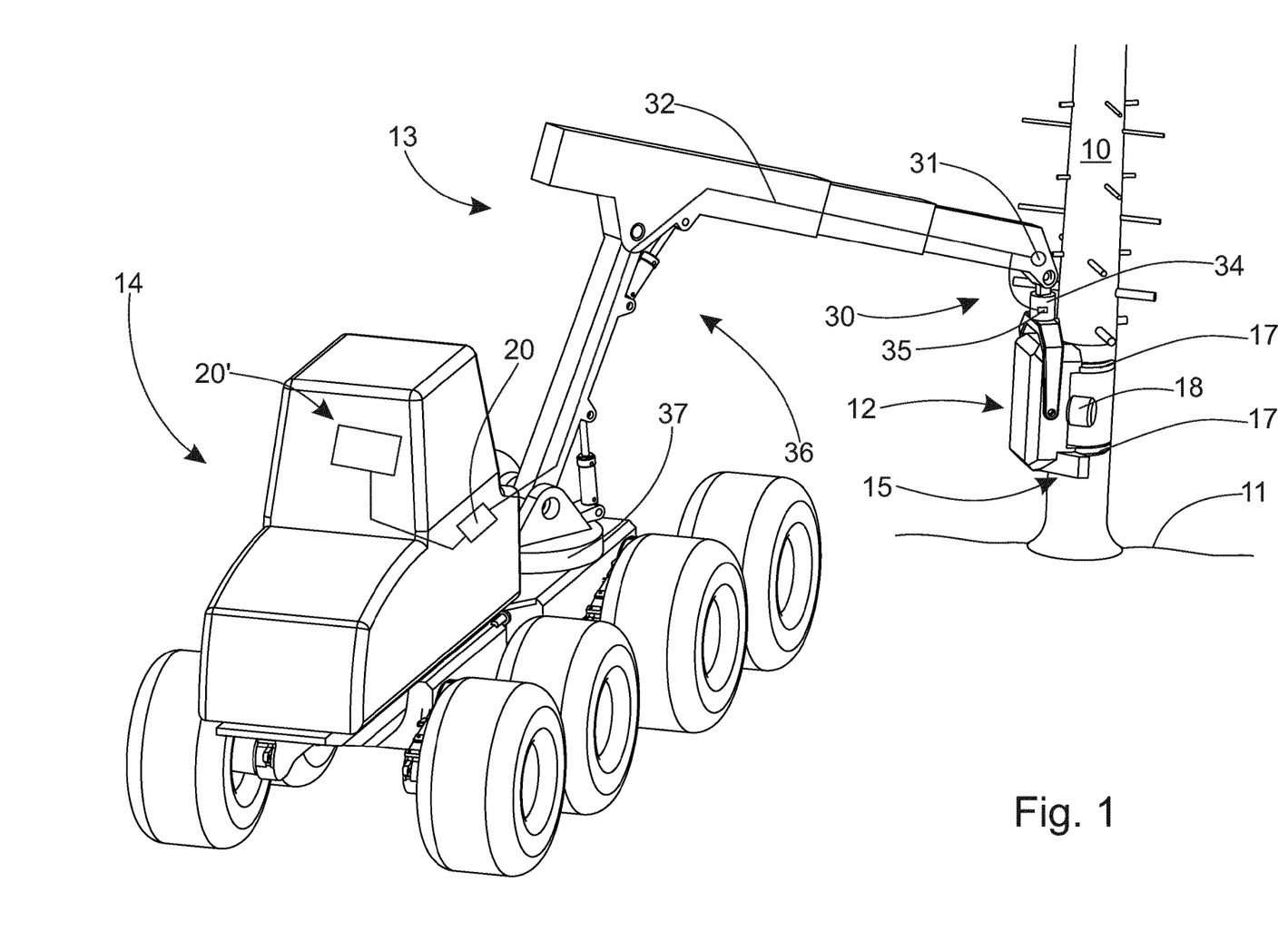
FIG. 1 shows the start of felling a tree by a forest machine.
Figure 2:
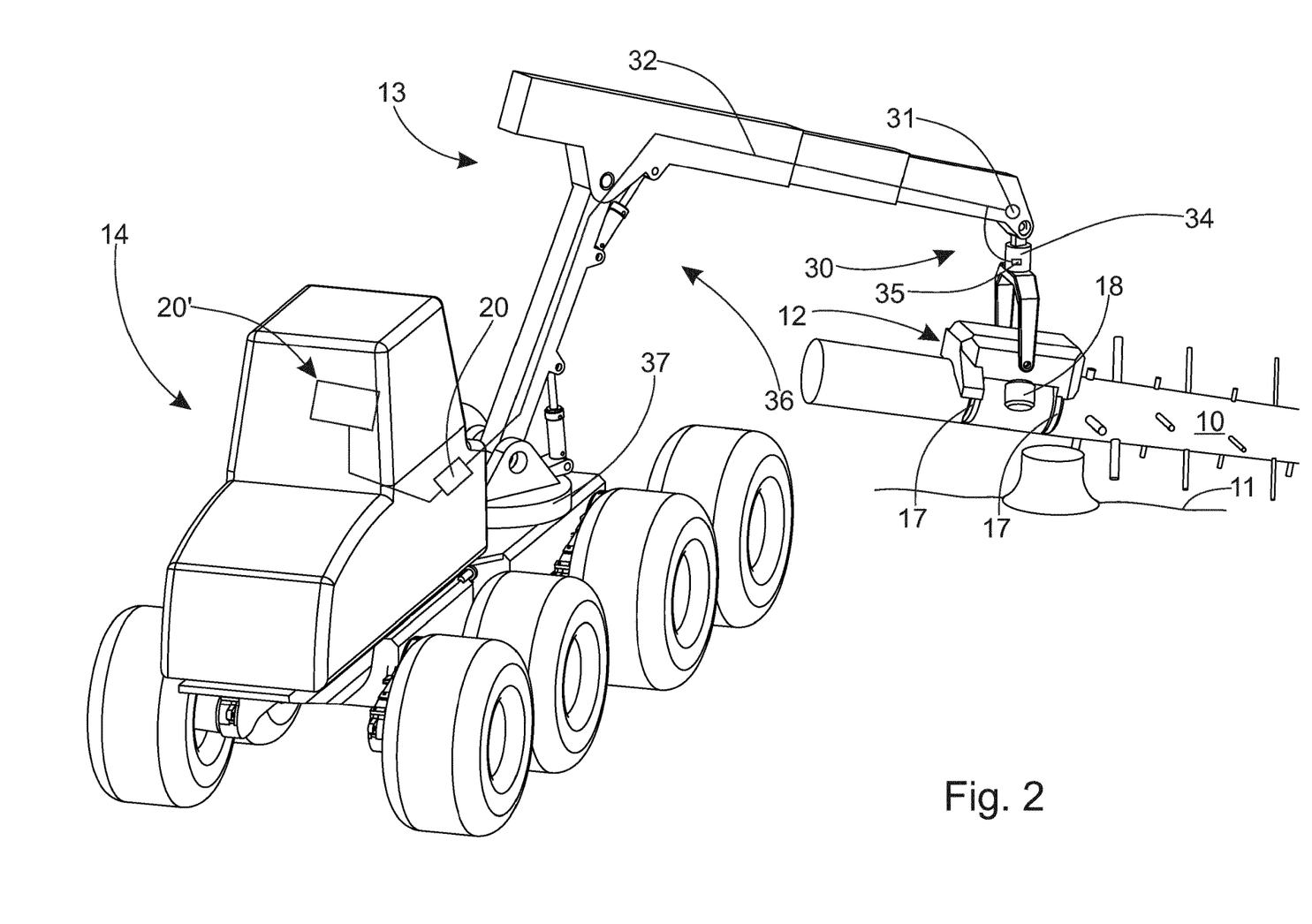
FIG. 2 shows a tree cut by a forest machine.

FIG. 1 shows schematically the operation of a forest machine in timber harvesting. The method relates particularly to felling sawing using a forest machine. In felling sawing, a selected tree 10 growing vertically in the ground is cut near the ground surface 11, generally with the lowest possible stump. An unnecessarily high stump will reduce yield and hinder the movement of forest machines in the forest during and after timber harvesting. In the method a felling head 12, which is placed near the tree 10 to be felled, is used. The felling head 12 is installed on a set of booms 13, which are attached to the forest machine 14. Generally, when felling, the forest machine is stationary and the reach of the set of booms is utilized to move the felling head to the desired tree and further to control the felled tree. In FIG. 1, the felling head 12 is already around the tree 10. Next, the felling head is lowered to minimize the stump. Finally, sawing 16 is performed on the tree 10 by the sawing device 15 fitted to the felling head 12. Depending on the tree being felled, one or more saw cuts are needed for felling and each saw cut has its own risks. The different saw cuts are described in detail later. In FIG. 2, the tree 10 is already cut. Here the felling head 12 is a harvester head, which includes delimbing blades 17 and feed rollers 18, in addition to the saw device 15. The feed rollers are then used to run the tree against the delimbing blades, thus removing the tree's branches. On the other hand, using the feed operation, the felling head set around the tree can be run slowly up or down the tree before sawing. In FIG. 2, part of the tree has already been limbed, the end of the tree having withdrawn from the saw device. From here delimbing is continued, until the desired length of the timber grade is reached, after which the trunk is cut by the saw device. Delimbing and cutting is repeated as necessary, according to the size of the tree.

Figure 3:
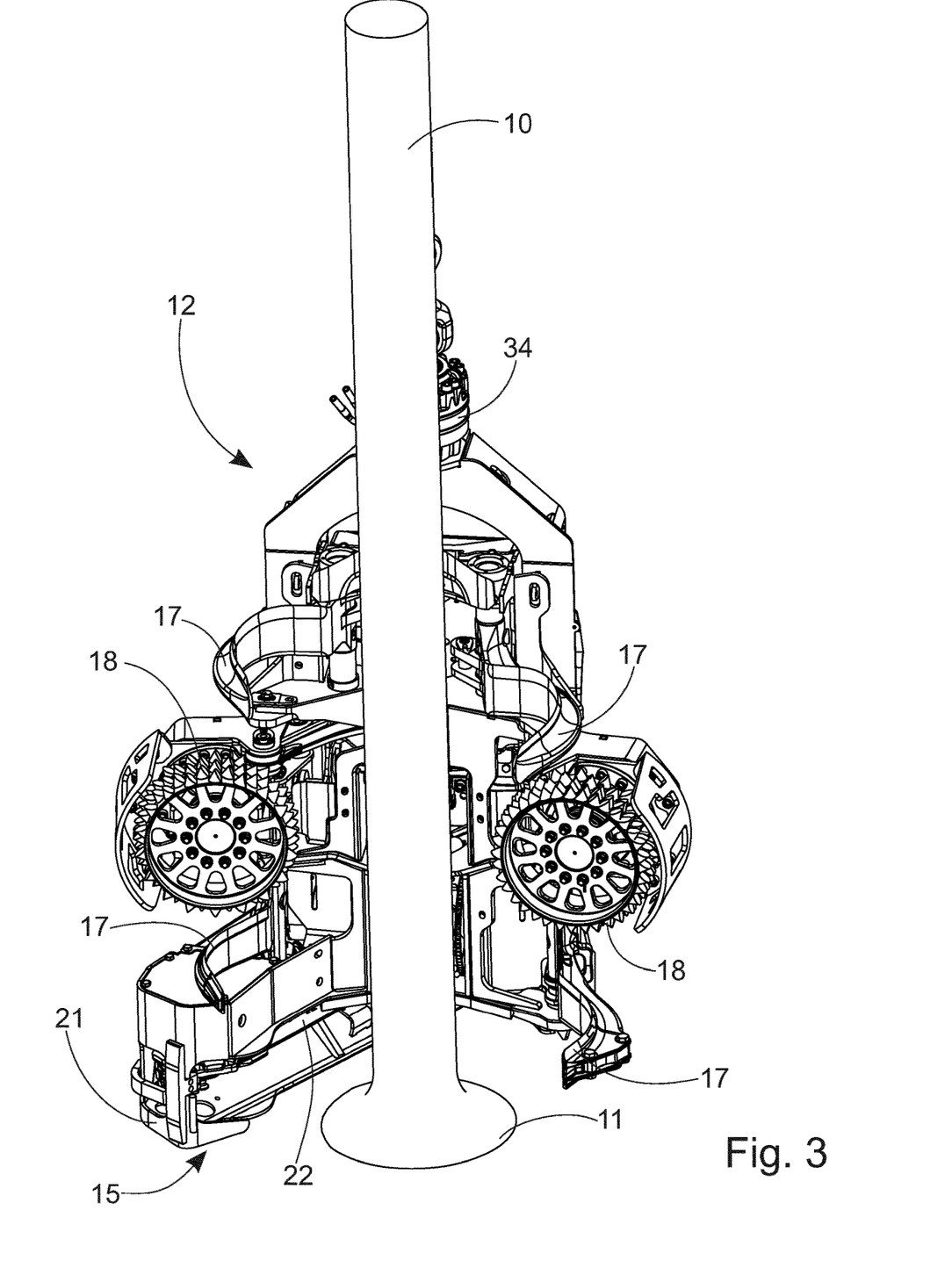
FIG. 3 shows the placing of the felling head near a tree to be cut.

In the invention, before making the saw cut 16 the saw device is set to a selected level 19 relative to the ground surface 11. The selection can be made for example in such a way that the level 19 is safe in terms of sawing 16. When the level is selected, the felling head is near the tree at a point that is at a distance from the tree, usually used by one versed in the art. Contact with the tree is not essential, but the felling head can be, for example, closed or open around the tree. According to one embodiment, when selecting the level, the felling head is set in contact with the tree, the felling head being either closed or open. Such a situation is shown in FIG. 3, in which the felling head 12 is behind the tree 10 and the saw device 15 is visible. Thus the driver can ensure a safe level for sawing. The saw device 15 is preferably kept in the forest machine 14 driver's line of sight, but this is not essential in terms of the method. On account of the geometry of the felling head and the whole forest machine, in the natural felling direction, the felling head is, however, generally at a different attitude compared to that in FIG. 3. In other words, the felling head in on a different side of the tree, so that the saw device may be invisible. This is no longer a problem, because the selected level is recorded in the forest machine's 14 data system 20. The recorded level is then always known, even if the felling head is turned, lifted, lowered, and/or even operated at times away from the tree. In other words, the felling head's attitude and even grip can be changed, and then guided or controlled by the data system set to a natural and safe direction and level in terms of the felling direction and sawing. More generally, after recording the level 19 sawing 16 is performed from the selected side of the tree 10. If necessary, the felling head 12 is turned to the desired side of the tree 10 to perform sawing 16.

Figure 4A:
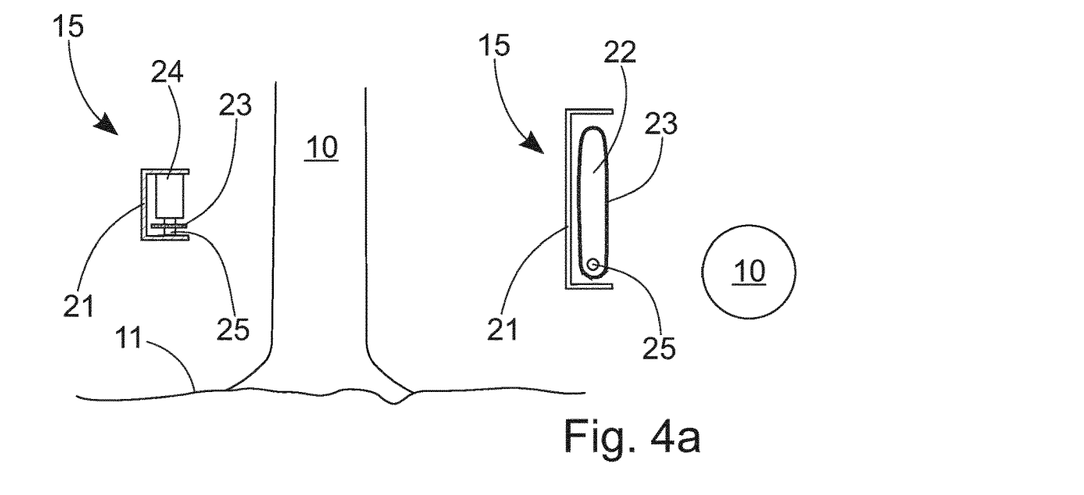
FIG. 4a shows side and top views of the initial stages of the method according to the invention.
Figure 4B:
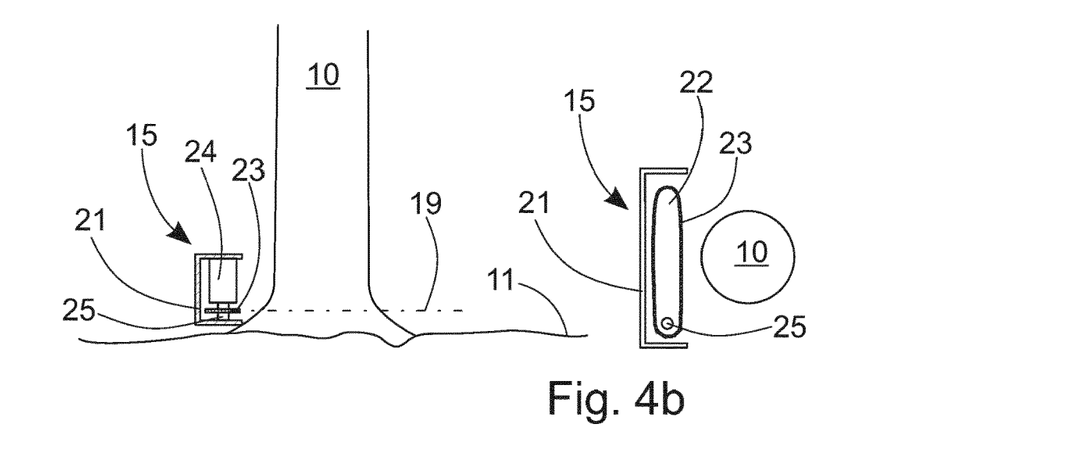
FIG. 4b shows the middle stage of the method according to the invention, in the same way as FIG. 4a, FIG. 4c shows the end stage of the method according to the invention, in the same way as FIG. 4a, FIG. 5 shows an example of different saw cuts.
Figure 4C:
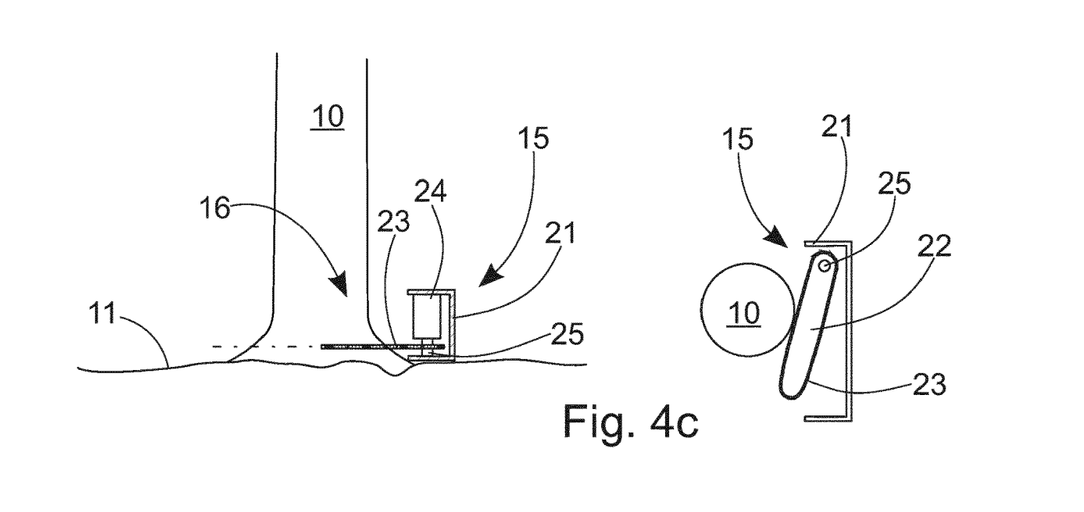

FIGS. 4a-4c show the principle of the method according to the invention. Here only the saw device 15 is shown 15, the location of which affects different saw cuts and their safety, or more generally the height of the stump. In FIG. 4a, the felling head with the saw device 15 is brought towards the tree 10. On the left-hand sides of the figures, the tree is seen from the side, and on the right-hand sides from above. In FIG. 4b, the driver sees the saw device 15 and can lower the felling head to a selected level, such as one that is safe for sawing, which, according to the invention, is recorded in the data system. The felling head is then turned, for example, to a side of the tree according to the natural felling direction, and sawing is performed. In the situation according to FIG. 4c, the saw device 15 reaches to cut the tree 10 with a single saw cut, so that the only sawing needed is felling sawing. Here too, there is great benefit from the method, as the bar of the saw device extends clearly outside the tree, thus being exposed to striking the ground or a stone. Now using the method a selected level can be easily defined, such a one that is safe in terms of sawing, and then fell-sawed with a single saw cut, without risks.

Figure 8:
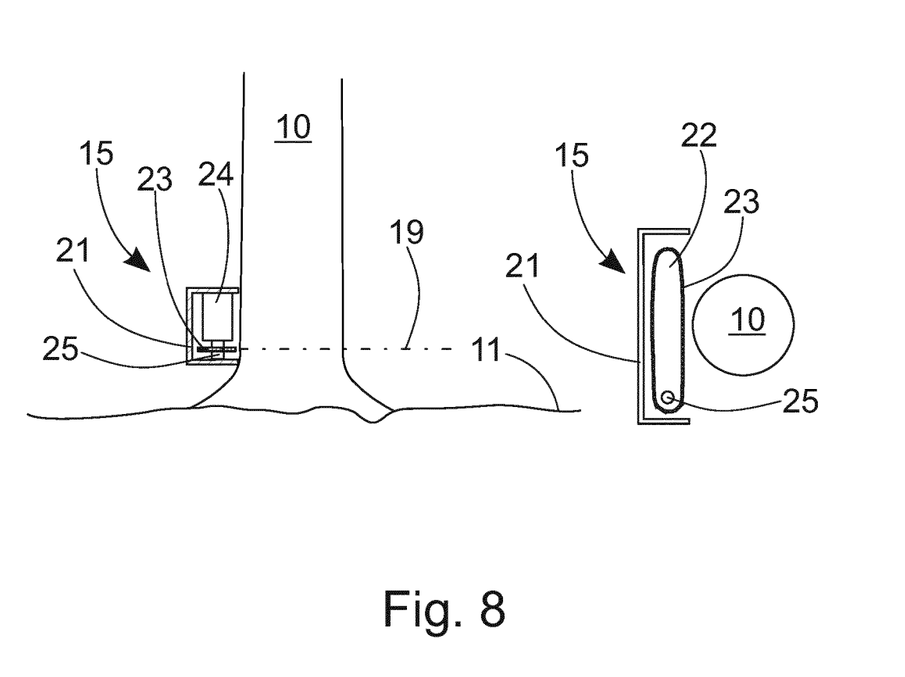
FIG. 8 shows an alternative level.

On the basis of his experience and visible observations, the driver can determine the level and record it in the data system. Recording can be a separate operations, such as pressing a button, or part of an operation that precedes determining the level. The level is then recorded at least partly programmatically. One preferred way to define a selected, such as a safe level 19 is to lower the saw device 15 onto the ground 11 before sawing 16. Determining the level takes place near the tree, with the grab either closed or open. This is shown in FIG. 4b. If necessary, the felling head is rotated to find possible obstacles. The saw device is then sufficiently high above the ground to prevent sawing the ground. At the same time, possible individual obstacles such as stones can be detected. Alternatively, the felling head 12 is lowered as far it can be lowered when set around a tree 10. This is shown in FIG. 8, in which the felling head 12 is closed and the feed rollers are used to run the felling head slowly downwards. The felling head 12 stops at the root collar before the saw device strikes the ground. This is a second example of a selected level, which is utilized in other saw cuts. The level can be used as a reference level, which in practice is the stump's height. The idea is to perform sawing as closely as possible to the surface of the ground, while taking into account the height of the remaining stump. Local demands or practices can set pre-conditions relative to the level concerning the maximum height of stumps. For example, local demands or practices can require that five centimetres of useful timber can remain after the root's uppermost root collar. The recorded levels of one or more previous trees can also be utilized when sawing the next trees. For example, on even ground, or if the forest machine remains at essentially the same attitude and height despite moving to the next tree, the felling head can be programmatically run to essentially the same level as the previous trees. This accelerates and facilitates work.

The saw device 15 includes a casing 21 open on one side, on which the saw bar 22 is rotatably supported. Here the rotation point is at the location of the shaft 25 of the hydraulic motor 24 driving the saw chain 23. As the saw chain 23 rotates, the saw bar 22 is turned towards the tree 10, thus creating a saw cut.

Figure 7A:
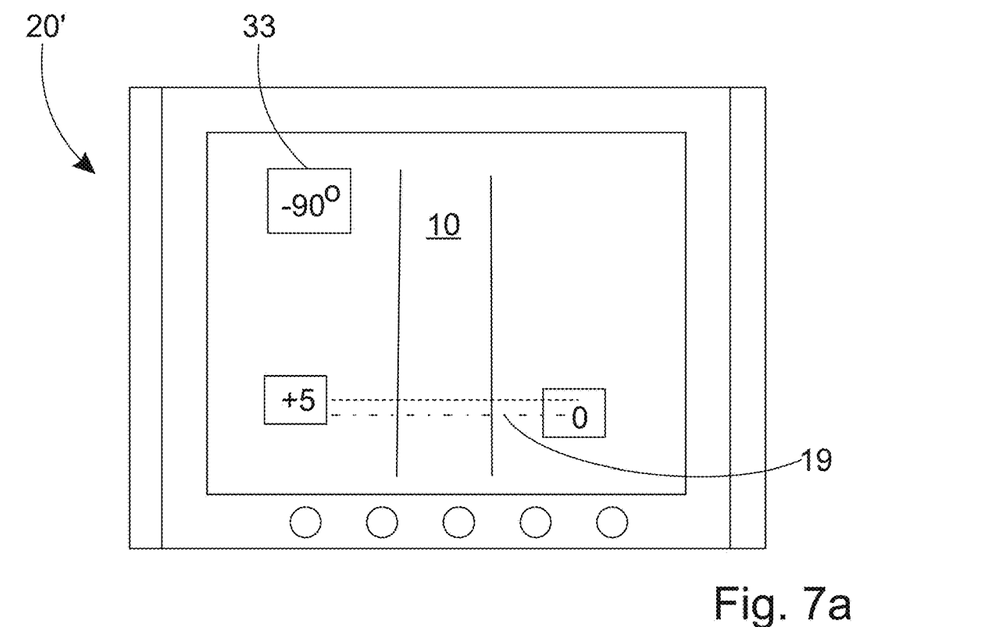
FIG. 7a shows an example view of the display.
Figure 7B:
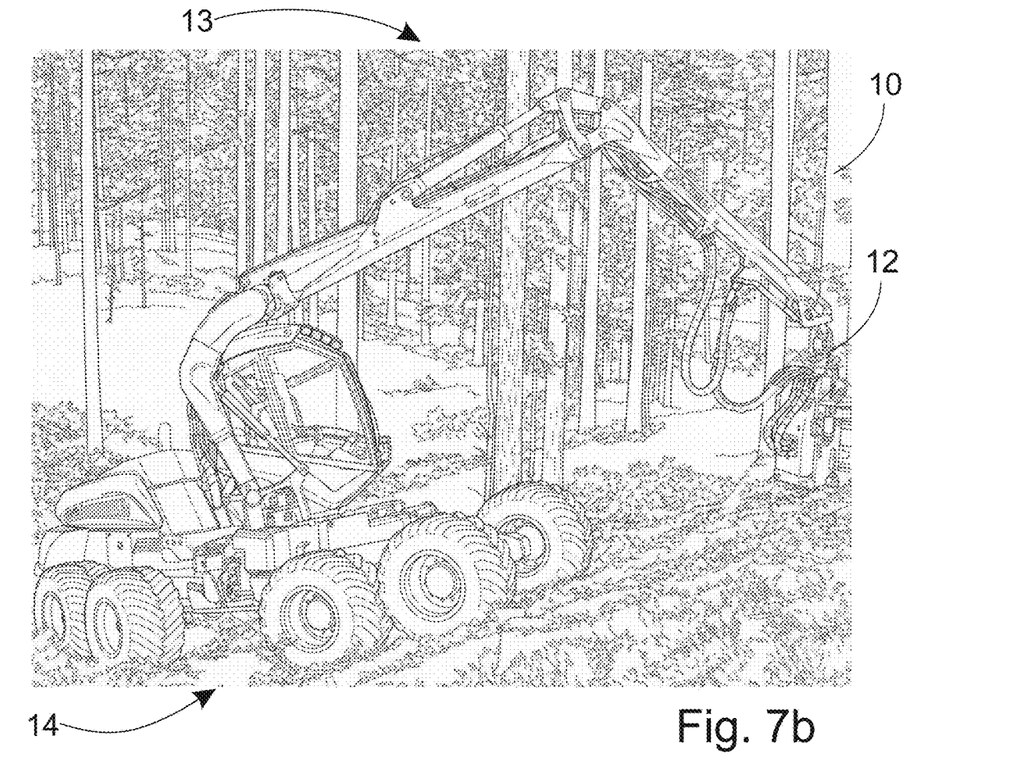
FIG. 7b shows a forest machine working on a slope.

The procedure described above applies to most situations. However, on sloping ground the saw device 15 is lowered against the ground surface 11, or as low as possible of the side of the upper slope (FIG. 7b). This then avoids the sawing striking the ground, even through sawing takes place from the side of the lower slope or from either side.

The sawing 16 to be carried out using the saw device is, according to the situation, undercut sawing 26, counter-cut sawing 27, or felling sawing 28. These three different sawing types are collected in FIG. 5. In addition, here the tree's 10 diameter relative to the saw device is large and there are butt swellings 29 in the tree's butt. Thus, the tree cannot be cut through with a single saw cut. Here the saw device is a chain saw, the rotation point of the guide bar of which is shown with a circle and the path of motion of the saw bar with lines. First is undercut sawing 26, which is shown with broken lines. Undercut sawing is perpendicular to the felling direction and thus helps to guide the tree in the correct direction. At the same time, splitting of the butt is avoided when the tree falls after sawing. In FIG. 6a, undercut sawing 26 has been done and the tree still remains standing. If necessary, more than one undercut is made on top of each other. Here too there is benefit from recording the level in the system.

Figure 6A:
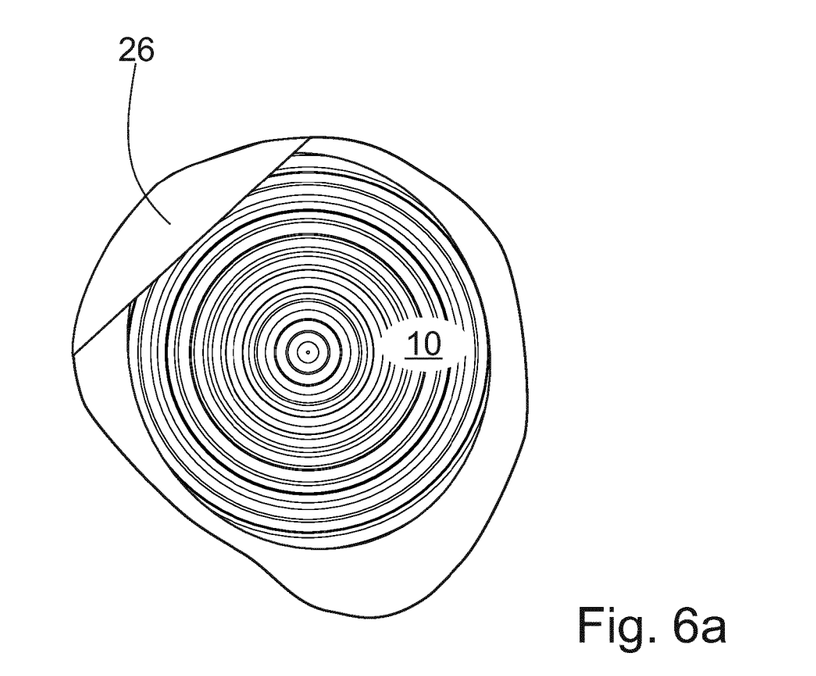
FIG. 6a shows the first saw cut of FIG. 5.
Figure 6B:
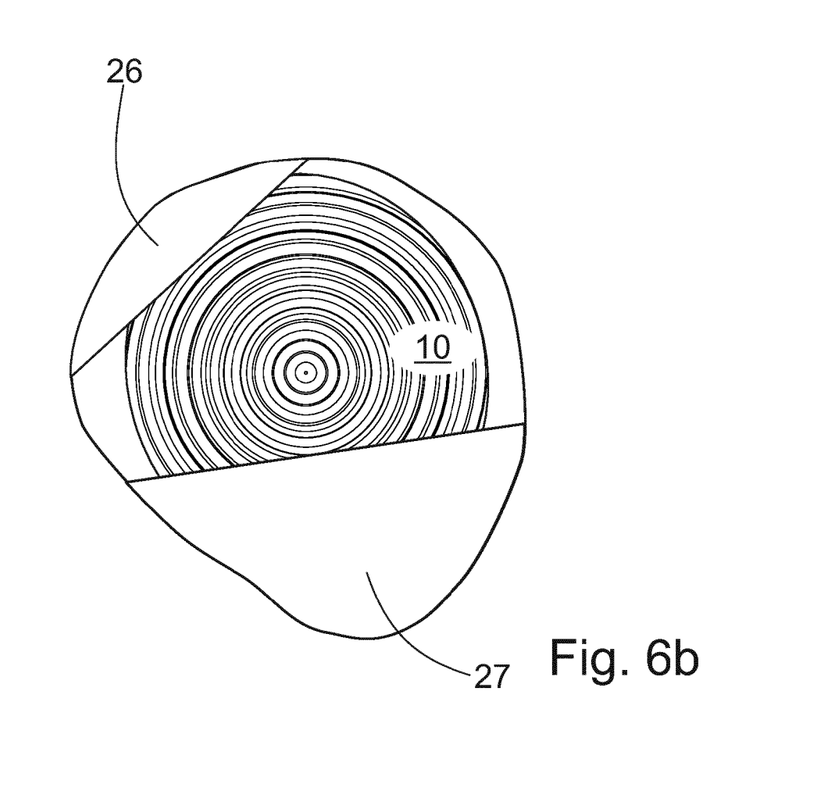
FIG. 6b shows the second saw cut of FIG. 5.

Here the second saw cut is a counter-cut 27, which is needed because the saw bar does not reach to cut the tree with a single saw cut, despite the undercut sawing. Counter-cut sawing is done from a different side of the tree to the actual felling sawing and there can be several counter-cuts. Here counter-cut sawing is shown by dot-and-dash lines. The advantages of the method are emphasized when making several saw cuts. In addition to safe sawing, the data system can if necessary be utilized to bring all the various saw cuts to essentially the same level. The butt then becomes smooth so that separate trimming sawing is unnecessary. In FIG. 6b, counter-cutting 27 has also been done, leaving more than half of the tree. The remaining part forms a beard, which keeps the tree standing and helps to guide the tree to fall in the chosen direction. If necessary, a second counter-cut is made.

Figure 5:
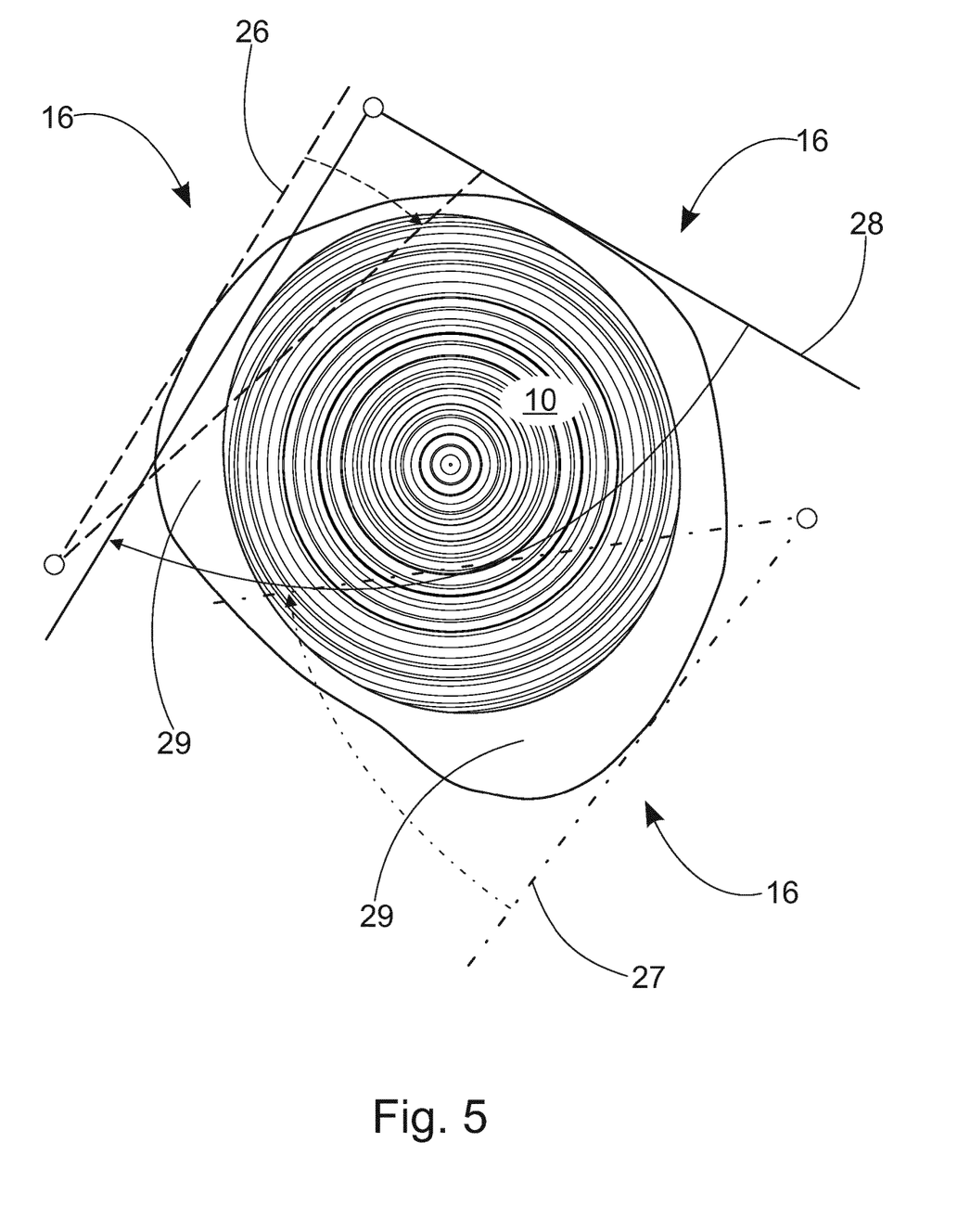

Before felling sawing 28, the felling head is rotated to an attitude, which in the felling head shown is at about 90 degrees to the undercut 26 (FIG. 5*a*). Then firstly the felling head and set of booms are positioned naturally in terms of sawing and the tree's felling direction. In addition, the saw bar reaches to saw the beard, which in the final stage of felling sawing forms a hinge in the direction of the undercut. This helps to guide the tree to fall in the chosen direction.

The level 19 is preferably defined using the sensing 30 that is fitted to the set of booms 13 belonging to the forest machine 14. Initially in the method definition means mainly the recording of the level in the data system, once the driver has first set the felling head to the selected height. In the different saw cuts, definition is then mainly the aligning of the felling head with the previously recorded level, guided or controlled by the data system. In FIG. 1, the sensing 30 is arranged at the end of the set of booms and the sensing 30 includes one or more 3D-acceleration sensors 31. The location is as close as possible to the felling head 12. In addition, the sensing is sufficiently accurate when the forest machine remains stationary during sawing. Here the 3D-acceleration sensor 31 is connected by cables 32 to the forest machine's 14 data system 20, to which a display 20' is also connected. The sensing, such as, for example, the said 3D-acceleration sensor, which is used to define the level of the felling head, can also be wirelessly connected to the forest machine's 14 data system. In general terms, the sensing is used to detect the boom and the attitudes and positions of its parts, when the level of the felling head relative to the forest machine is also known. The sensing can also include sensor means for determining the pivot angles of the set of booms and thus for determining the level of the saw device 15. Instead of, or as well as the 3D-acceleration sensors, the sensor means can include torsion sensors, attitude sensors, and/or position sensors for the cylinders' pistons. In addition, the sensing can also includes sensor means, which are used to determine the velocity and state of motion of the boom end/felling head, for example, a 3D-angle velocity sensor, in addition to the 3D-acceleration sensors.

The display shows the driver information, for example, on the forest machine itself and on work productivity, as well as, for example, a map program. The display can also have press-buttons for making selections and settings. Touch functions are also possible. The display is also utilized in the method, as the level 19 is shown graphically on the display 20', which is fitted as part of the forest machine's 14 data system 20. FIG. 7*a* shows schematically the display 20', the window of which shows a tree 10 and the level 19 recorded in the data system. In the window, the level is shown by a zero and a dot- and dash line. The present level is then shown by a broken line, which is slightly higher in the window than the recorded level. If it is wished that the saw cuts are in the same position, the driver can, guided by the window, lower the felling head, until the lines are on top of each other. In specific cases, it may be necessary to make the different saw cuts at different heights. In addition to static signs, the display can be used to show animations, which guide and instruct the driver. For example, the optimal turning direction to the next sawing can be shown on the display by an animated arrow.

Instead of a manual setting, the felling head 12 can alternatively be positioned to the recorded level 19 programmatically. In practice, when the felling head is then near to the tree, by pressing a button, for example, the data system can control the set of booms in such a way that the felling head and even the saw device take up, for example, a level that is selected as safe for sawing, or for some other reason. Here too, instead of a press-button the operation can be connected to form part of some other functionality. For example, after recording and the rotation of the felling head, when the delimbing blades are closed the set of booms moves controlled by the data system so that the felling head settles at the recorded level. The driver is then saved from making extra operations. In fact, thanks to the method operation is accelerated, as visual positioning of the felling head is eliminated. At the same time, the saw cuts can be made at the selected level. More generally the saw cuts are aligned programmatically with other possible saw cuts.

Relating to saw cuts, in the method the data system is also utilized more widely than described above. Surprisingly, the forest machine's 14 sensing 30 is also used to determine the rotation angle 33 of the felling head 12 at any time, on the basis of which the various saw cuts 16 are aligned with other possible saw cuts. This time, the alignment is the rotation angle at any time instead of the level, i.e. the position of the felling head on different sides of the tree. For example, in the undercut sawing shown in FIG. 5, the rotation angle can be recorded in the data system as a kind of zero position. Thus the attitude of the felling head in the other saw cuts can be compared to this reference point. The rotation angle during the definition of the level can also be recorded, but in practice the undercut sawing position is perhaps more important. Then even after several counter-cuts the felling head can be accurately set to an attitude, which is natural in terms of felling sawing and especially of felling. In the applicant's forest machine, this rotation-angle difference is 90 degrees, but depending on the manufacturer it can differ, which can be taken into account when programming the data system. The rotation angle 33 is preferably also shown graphically of the display 20', which is fitted as part of the forest machine's 14 data system 20. The rotation angle 33 is also shown in the window of the display 20' in FIG. 7*a*. In order to determine the rotation angle, in the embodiment of FIG. 1 a detector 35 belonging to the sensing 30 is arranged in the rotator 34, and is used to monitor the felling head's rotation angle. The detector 35 is also connected by a cable 32 to the data system 20.

Correspondingly, the rotation angle can be utilized in counter-sawing. More specifically, when it is known through the sensing in which attitude the felling head was during counter-sawing, the attitude to which the felling head should be turned for felling sawing will be known. In practice, the felling head is then rotated from counter-sawing in such a way that the felling saw cut is formed from precisely the opposite side. The timber then remaining will be of equal thickness, which is important for the success of felling and for the beard's hold. Similarly, when the rotator's rotation angle is known, as is the attitude, to which the felling head should be rotated after the first sawing, it is possible to automate, or at least semi-automate the counter sawing, to accelerate working and improve quality and accuracy.

In the method according to the invention described above, the forest machine's data system is utilized in a new and surprising manner. The level is relative, but is unchanged for one tree irrespective of the felling head's rotation angle. In the figures, the level is shown for reasons of clarity as being at the position of the saw's guide bar, because by using the recorded level the saw cuts needed to fell the tree are obtained, if necessary, precisely and easily at the same position. The invention also relates to a system in felling sawing using a forest machine. According to FIG. 1, the forest machine 14 includes a felling head 12 arranged to be set near the tree 10 to be felled. The forest machine also includes a saw device 15 fitted to the felling head 12, to perform sawing 16 on the tree 10, and further means 36 for operating the felling head 12 and the saw device 15. An important part of these means 36 is a set of booms 13, to which the felling head 12 is attached, fitted to the forest machine 14. With the aid of the set of booms, the felling head is brought to the selected tree and the felling head is set at the desired attitude, and is further controlled during and after felling the tree. In the invention, the data system belonging to the forest machine 14 is arranged to record the level 19 relative to the ground surface 11 selected in the saw device 15 before sawing. Thus the system can be used further according to the method and its sub-stages.

The method is advantageous in controlling especially large diameter and particularly butt swellings' counter sawing and the actual felling sawing. The method is of great benefit also in the felling sawing of small-diameter trunks. The method is easily used especially in forest machines, such as harvesters, equipped with a boom-tip-control system, in which comprehensive sensoring is already in use. The boom-tip-control system facilitates to driver's work, as the driver guides the felling head in the desired direction, while the boom-tip-control system controls the cylinders of the set of booms to achieve the desired movement, without the driver himself needing to control the individual cylinders.

The set of booms 13 is fitted to the forest machine 14 by its base 37. The boom-tip-controlled set of booms knows its own position relative to its base and thus also to the forest machine. However, in the data system there is no sensor telling how high off the ground surface the felling head is. In the invention, the driver himself defines the level and records it in the data system. After this, the data system knows, through the sensoring, the level defined for the relevant tree. Despite possible movements of the set of booms, the accuracy of the definition remains, the forest machine remaining stationary. The driver can then rotate the felling mead to different sides of the tree while the data system keeps the felling head at the level, so that the saw cuts occur at the same position. Case-specifically, the driver can move the felling head vertically direction, as already stated.

In the invention, the forest machine's boom-tip-controlled boom control system can be exploited to a considerable extent. The boom-tip-controlled set of booms' control system can comprise at least one measuring device or measuring apparatus, for determining the attitude of at least one boom of the forest machine's set of booms. The attitude of at least one structural component of the said set of booms comprises a definition of the angle of tilt of at least one structural component in the direction of at least one axis of the structural component, a reference direction, such at the direction of the gravity vector, and/or relative to a reference point. The reference point is preferably the attachment point of the forest machine's base machine and/or of the set of booms, in the forest machine. Each boom of the set of booms is preferably equipped with a measuring device to determine the attitude of the said boom. In the invention, it is, on the other hand, also possible to utilize the forest machine's measuring devices fitted in connection with the normal set of booms, which are arranged to determine the attitude and/or state of motion of at least one structural component of the set of booms. In the invention, the forest machine's control system and/or measuring apparatus is arranged to measure the attitude and/or state of motion of the forest machine's set of booms and/or individual boom components of the set of booms, as well as the attitude, rotation angle, and/or state of motion of the felling head. Preferably, the said control system is arranged to detect automatically the forest machine's set of booms' felling head's attitude and/or rotation angle by detecting the attitude and/or state of motion of individual booms.

Large tree trunks, particularly spruce, have often wide butt swellings, making it necessary to make as many as three or four counter saw cuts. The counter saw cuts are located on different sides of the tree, so that the precise height at which the saw bar enters the tree is not necessarily visible from the cab. This is a hazard, if the driver is not used to making such cuts. Safety improves, as using the method the height at which the counter cuts are located is known, thus avoiding sawing into the ground or a stone. Of course, the method according to the invention facilitates the work of an experienced driver too. The data system acts as an aid, facilitating and accelerating operations. Some of the operations can even be automated in the data system.

In the invention, the term setting refer to the movement of the felling head in general, for example, relative to a tree. The term positioning refers to moving the felling head to a recorded level. Alignment relates to sawing, there being two types of alignment. Firstly saw cuts can be aligned vertically with other possible saw cuts. Secondly, the direction in which sawing is performed can be aligned with the directions of other saw cuts. Once the selected level has been recorded, the first saw cut can be performed. If necessary, before sawing the felling head is positioned to the level, guided by the display or programmatically. The level and/or direction of other possible saw cuts are than aligned according to the previous saw cut guided by the display or programmatically.

The invention claimed is:

1. A method for felling sawing using a forest machine, in which method a felling head is used, which is set near to a tree to be felled, and sawing is performed on the tree using a saw device fitted to the felling head, wherein before sawing, the saw device is set to a selected level relative to a ground surface, which is recorded in a data system belonging to the forest machine.

2. The method according to claim 1, wherein the level selected is a safe level in terms of sawing.

3. The method according to claim 1, wherein after the recording of the level sawing is performed from a selected side of the tree.

4. The method according to claim 1, wherein, before recording of the level, the saw device is lowered against the ground surface, or as low as it is possible to lower the felling head when set around the tree, before sawing.

5. The method according to claim 4, wherein, on sloping ground the saw device is lowered against the ground surface, or as low as possible, on a side of the upper slope.

6. The method according to claim 1, wherein the sawing is undercut sawing, counter-sawing, or felling sawing.

7. The method according to claim 1, wherein the level is determined using one or more sensors, which is arranged in a set of booms belonging to the forest machine.

8. The method according to claim 7, wherein one or more sensors are configured to determine a pivot angle of the set of booms and thus to determine the level of the saw device.

9. The method according to claim 1, wherein the level is shown graphically on a display, which is arranged as part of the forest machine's data system.

10. The method according to claim 1, wherein the felling head is positioned programmatically at the recorded level.

11. The method according to claim 1, wherein using sensoring belonging to the forest machine the rotation angle of the felling head is determined at any time, on the basis of which the various saw cuts are aligned with other possible saw cuts.

12. The method according to claim 1, wherein the saw cuts are aligned programmatically with other possible saw cuts.

13. A system for felling sawing using a forest machine, which forest machine includes a felling head arranged to be set near a tree to be felled, a saw device fitted to the felling head for performing sawing on the tree and means for operating the felling head and saw device, wherein a data system belong to the forest machine is arranged to recorded a level relative to a ground surface selected for the saw device, before sawing.

14. The system according to claim 13, wherein the system is arranged to implement the method according to claim 2.

15. The system according to claim 13, wherein the forest machine's data system includes a boom-tip-control system and sensoring it requires.

16. The system according to claim 13, wherein the system is arranged to implement the method according to claim 3.

17. The system according to claim 13, wherein the system is arranged to implement the method according to claim 4.

18. The system according to claim 13, wherein the system is arranged to implement the method according to claim 6.

19. The system according to claim 13, wherein the system is arranged to implement the method according to claim 7.

20. The system according to claim 13, wherein the system is arranged to implement the method according to claim 9.

* * * * *